United States Patent
Okeljas, Jr.

(10) Patent No.: US 9,695,064 B2
(45) Date of Patent: Jul. 4, 2017

(54) REVERSE OSMOSIS SYSTEM WITH ENERGY RECOVERY DEVICES

(71) Applicant: Fluid Equipment Development Company, LLC, Monroe, MI (US)

(72) Inventor: Eli Okeljas, Jr., Newport, MI (US)

(73) Assignee: Fluid Equipment Development Company, LLC, Monroe, MI (US)

( * ) Notice: Subject to any disclaimer, the term of this patent is extended or adjusted under 35 U.S.C. 154(b) by 667 days.

(21) Appl. No.: 13/865,257

(22) Filed: Apr. 18, 2013

(65) Prior Publication Data

US 2013/0277310 A1   Oct. 24, 2013

Related U.S. Application Data (60) Provisional application No. 61/636,264, filed on Apr. 20, 2012.

(51) Int. Cl.
*B01D 37/00* (2006.01)
*C02F 1/44* (2006.01)
(Continued)

(52) U.S. Cl.
CPC ............ *C02F 1/441* (2013.01); *B01D 61/022* (2013.01); *B01D 61/025* (2013.01); *B01D 61/06* (2013.01);
(Continued)

(58) Field of Classification Search
None
See application file for complete search history.

(56) References Cited

U.S. PATENT DOCUMENTS

| | | | |
|---|---|---|---|
| 659,930 | A | 10/1900 | Kemble |
| 893,127 | A | 7/1908 | Barber |

(Continued)

FOREIGN PATENT DOCUMENTS

| | | |
|---|---|---|
| DE | 35 10 160 A | 9/1986 |
| DE | 299 07 813 U | 8/1999 |

(Continued)

OTHER PUBLICATIONS

"VDF" (Mar. 20, 2014—PDF in file).*

(Continued)

*Primary Examiner* — Allison Fitzsimmons
(74) *Attorney, Agent, or Firm* — Harness, Dickey & Pierce, PLC (57) ABSTRACT

A reverse osmosis system according to the present disclosure includes a first membrane array, a second membrane array, a hydraulic pressure booster, and a motor-generator. The first membrane array is configured to generate a first permeate stream and a first brine stream from a feed stream. The second membrane array is configured to generate a second permeate stream and a second brine stream from the first brine stream. The booster is configured to use energy from the second brine stream to increase pressure of at least one of the feed stream and the first brine stream. The motor-generator is coupled to the hydraulic pressure booster and is operable to use energy from a power supply to drive the hydraulic pressure booster. The motor-generator is also operable to use energy from the second brine stream to provide power to the power supply.

20 Claims, 6 Drawing Sheets

(51) Int. Cl.
*B01D 61/02* (2006.01)
*B01D 61/06* (2006.01)
*B01D 61/12* (2006.01)
*C02F 1/00* (2006.01)
*C02F 103/08* (2006.01)

(52) U.S. Cl.
CPC .......... *B01D 61/12* (2013.01); *B01D 2313/18* (2013.01); *B01D 2313/246* (2013.01); *B01D 2317/022* (2013.01); *C02F 1/008* (2013.01); *C02F 2103/08* (2013.01); *C02F 2209/40* (2013.01); *C02F 2303/10* (2013.01); *Y02W 10/30* (2015.05)

(56) References Cited

U.S. PATENT DOCUMENTS

| | | | |
|---|---|---|---|
| 1,022,683 A | 4/1912 | Kienast | |
| 1,024,111 A | 4/1912 | Anderson | |
| 1,066,581 A | 7/1913 | Brown | |
| 2,715,367 A | 8/1955 | Kodet et al. | |
| 2,748,714 A | 6/1956 | Henry | |
| 3,160,108 A | 12/1964 | Sence | |
| 3,563,618 A | 2/1971 | Ivanov | |
| 3,614,259 A | 10/1971 | Neff | |
| 3,664,758 A | 5/1972 | Sato | |
| 3,748,057 A | 7/1973 | Eskeli | |
| 3,826,610 A | 8/1974 | Swearingen | |
| 3,969,804 A | 7/1976 | MacInnes et al. | |
| 3,999,377 A | 12/1976 | Oklejas et al. | |
| 4,028,885 A | 6/1977 | Ganley et al. | |
| 4,029,431 A | 6/1977 | Bachl | |
| 4,187,173 A | 2/1980 | Keefer | |
| 4,230,564 A | 10/1980 | Keefer | |
| 4,243,523 A | 1/1981 | Pelmulder | |
| 4,255,081 A | 3/1981 | Oklejas et al. | |
| 4,255,095 A | 3/1981 | Goulvestre et al. | |
| 4,288,326 A | 9/1981 | Keefer | |
| 4,321,137 A | 3/1982 | Kohler | |
| 4,353,874 A | 10/1982 | Keller et al. | |
| 4,432,876 A | 2/1984 | Keefer | |
| 4,434,056 A | 2/1984 | Keefer | |
| 4,472,107 A | 9/1984 | Chang | |
| RE32,144 E | 5/1986 | Keefer | |
| 4,632,756 A | 12/1986 | Coplan et al. | |
| 4,702,842 A | 10/1987 | Lapierre | |
| 4,830,572 A | 5/1989 | Oklejas, Jr. et al. | |
| 4,921,603 A | 5/1990 | Yen | |
| 4,936,997 A | 6/1990 | Taniguchi et al. | |
| 4,966,708 A | 10/1990 | Oklejas et al. | |
| 4,973,408 A | 11/1990 | Keefer | |
| 4,983,305 A | 1/1991 | Oklejas et al. | |
| 4,997,357 A | 3/1991 | Eirich et al. | |
| 5,020,969 A | 6/1991 | Mase et al. | |
| 5,043,071 A | 8/1991 | Anselme et al. | |
| 5,049,045 A | 9/1991 | Oklejas et al. | |
| 5,082,428 A | 1/1992 | Oklejas et al. | |
| 5,106,262 A | 4/1992 | Oklejas et al. | |
| 5,132,015 A | 7/1992 | Down | |
| 5,132,090 A | 7/1992 | Volland | |
| 5,133,639 A | 7/1992 | Gay et al. | |
| 5,154,572 A | 10/1992 | Toyoshima et al. | |
| 5,320,755 A | 6/1994 | Hagqvist et al. | |
| 5,338,151 A | 8/1994 | Kemmner et al. | |
| 5,340,286 A | 8/1994 | Kanigowski | |
| 5,401,395 A | 3/1995 | Hagqvist et al. | |
| 5,482,441 A | 1/1996 | Permar | |
| 5,499,900 A | 3/1996 | Khmara et al. | |
| 5,647,973 A | 7/1997 | Desaulniers | |
| 5,702,229 A | 12/1997 | Moss et al. | |
| 5,819,524 A | 10/1998 | Bosley et al. | |
| 5,951,169 A | 9/1999 | Oklejas et al. | |
| 5,980,114 A | 11/1999 | Oklejas, Jr. | |
| 6,007,723 A | 12/1999 | Ikada et al. | |
| 6,017,200 A | 1/2000 | Childs et al. | |
| 6,036,435 A | 3/2000 | Oklejas | |
| 6,110,360 A | 8/2000 | Hart, Jr. | |
| 6,110,375 A | 8/2000 | Bacchus et al. | |
| 6,116,851 A | 9/2000 | Oklejas, Jr. | |
| 6,120,689 A | 9/2000 | Tonelli et al. | |
| 6,139,740 A * | 10/2000 | Oklejas | B01D 61/06 210/195.1 |
| 6,187,200 B1 | 2/2001 | Yamamura et al. | |
| 6,190,556 B1 | 2/2001 | Uhlinger | |
| 6,299,766 B1 | 10/2001 | Permar | |
| 6,309,174 B1 | 10/2001 | Oklejas, Jr. et al. | |
| 6,345,961 B1 | 2/2002 | Oklejas, Jr. | |
| 6,468,431 B1 * | 10/2002 | Oklelas, Jr. | B01D 61/022 210/195.2 |
| 6,508,937 B1 | 1/2003 | Kawashima et al. | |
| 6,589,423 B1 | 7/2003 | Chancellor | |
| 6,709,599 B1 | 3/2004 | Rosenberger et al. | |
| 6,713,028 B1 | 3/2004 | Oklejas, Jr. | |
| 6,797,173 B1 | 9/2004 | Oklejas, Jr. | |
| 6,881,336 B2 | 4/2005 | Johnson | |
| 6,908,546 B2 | 6/2005 | Smith | |
| 6,932,907 B2 | 8/2005 | Haq et al. | |
| 6,936,140 B2 | 8/2005 | Paxton et al. | |
| 7,077,962 B2 | 7/2006 | Pipes | |
| 7,150,830 B1 | 12/2006 | Katsube et al. | |
| 2003/0080058 A1 | 5/2003 | Kimura et al. | |
| 2004/0104157 A1 | 6/2004 | Beeman et al. | |
| 2004/0211729 A1 | 10/2004 | Sunkara et al. | |
| 2006/0157409 A1 | 7/2006 | Hassan | |
| 2006/0157410 A1 | 7/2006 | Hassan | |
| 2006/0226077 A1 | 10/2006 | Stark | |
| 2006/0254981 A1 | 11/2006 | Efraty | |
| 2007/0056907 A1 * | 3/2007 | Gordon | B01D 61/025 210/652 |
| 2007/0181473 A1 * | 8/2007 | Manth | B01D 61/022 210/137 |
| 2007/0199878 A1 | 8/2007 | Eisberg et al. | |
| 2007/0289904 A1 * | 12/2007 | Oklejas | B01D 61/022 210/87 |
| 2007/0295650 A1 | 12/2007 | Yoneda et al. | |
| 2008/0023410 A1 | 1/2008 | Efraty | |
| 2008/0217222 A1 | 9/2008 | Efraty | |
| 2009/0289008 A1 | 11/2009 | Linning et al. | |
| 2011/0198290 A1 | 8/2011 | Oklejas, Jr. | |

FOREIGN PATENT DOCUMENTS

| | | |
|---|---|---|
| EP | 1 508 361 | 2/2005 |
| FR | 2 281 782 A | 3/1976 |
| GB | 2 363 741 | 1/2002 |
| JP | 2001-104954 | 4/2001 |
| WO | WO02/09855 | 2/2002 |
| WO | WO2006/106158 | 10/2006 |
| WO | WO2007/146321 | 12/2007 |

OTHER PUBLICATIONS

International Search Report and Written Opinion regarding Application No. PCT/US2013/037146, ISA/Rijiwijk, NL dated Jul. 25, 2013.
El-Sayed E et al.: "Performance evaluation of two RO membrane configurations in a MSF/RO hybrid system". Desalination, Elsevier, Amsterdam, NL, vol. 128, No. 3, May 1, 2000, pp. 231-245, XP004204830; ISSN: 0011-9164; p. 232-p. 234; figure 1.
Geisler P et al.: "Reduction of the energy demand for seawater RO with the pressure exchange system PES". Desalination, Elsevier, Amsterdam, NL, vol. 135, No. 1-3, Apr. 20, 2001, pp. 205-210, XP004249642; ISSN: 0011-9164; the whole document.

* cited by examiner

REVERSE OSMOSIS SYSTEM WITH ENERGY RECOVERY DEVICES

CROSS-REFERENCE TO RELATED APPLICATIONS

This application claims the benefit of U.S. Provisional Application No. 61/636,264, filed on Apr. 20, 2012. The entire disclosure of the above application is incorporated herein by reference.

FIELD

The present disclosure relates to reverse osmosis systems, and, more specifically, to reverse osmosis systems with energy recovery devices.

BACKGROUND

This section provides background information related to the present disclosure which is not necessarily prior art.

Reverse osmosis (RO) systems use special membranes to separate a feed stream containing dissolved materials such as salt into two streams; one stream containing purified water called permeate and the other stream containing a concentrated solution of dissolved materials called concentrate or brine.

The amount of pressure to drive the separation process is strongly dependent on the concentration of dissolved solids in the feed stream. For fluids such as seawater, the minimum pressure required to drive the separation process can be on the order of 500 to 600 pound-force per square inch gauge (psig), but would typically be as high as 900 psig to achieve reasonable rates of permeate production. Such high pressure requires a great deal of energy to be expended by a high pressure pump (HPP).

In addition to the high pressure requirement, the RO process can only extract a limited amount of permeate from the feed stream. In the case of seawater RO process, typically 40 to 45% of the feed stream can be extracted as permeate with the balance discharged as concentrate waste.

The pressure of the permeate stream is low as its passage through the membrane absorbs the available pressure. The pressure of the concentrate stream, which did not pass through the membrane surface, remains very close to the feed pressure. Therefore, in the case of seawater, the concentrate pressure is very high.

Figure 1:
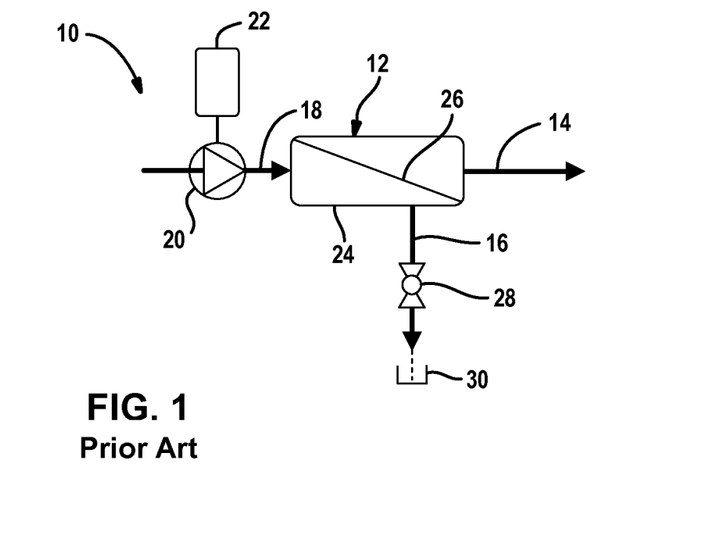
FIG. 1 is a schematic view of a first reverse osmosis system according to the prior art.

Referring now to FIG. 1, a reverse osmosis system 10 according to the prior art includes a membrane array 12 that generates a permeate stream 14 and a brine stream 16 from a feed stream 18. The feed stream 18 typically includes brackish or sea water. A feed pump 20 coupled to a motor 22 pressurizes the feed stream 18 to a required pressure, and the feed stream 18 enters the membrane array 12 at the required pressure.

The membrane array 12 includes a membrane housing 24 and a membrane 26. The portion of the feed stream 18 that flows through the membrane 26 before exiting the membrane array 12 forms the permeate stream 14. The portion of the feed stream 18 that does not flow through the membrane 26 before exiting the membrane array 12 forms the brine stream 16.

The permeate stream 14 is purified fluid flow at a low pressure. The brine stream 16 is a higher pressure stream that contains dissolved materials blocked by the membrane 26. The pressure of the brine stream 16 is only slightly lower than the feed stream 18. A control valve 28 may be used to regulate the flow through and pressure in the membrane array 12. The brine stream 16 may flow through the control valve 28 and to a drain 30.

Figure 2:
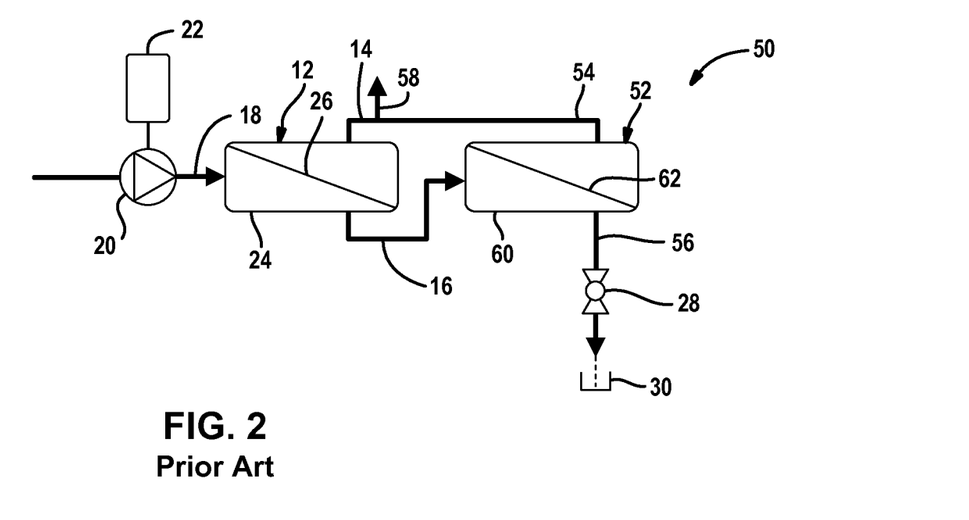
FIG. 2 is a schematic view of a second reverse osmosis system according to the prior art.

Referring now to FIG. 2, a reverse osmosis system 50 according to the prior art is similar to the reverse osmosis system 10 of FIG. 1 except that the reverse osmosis system 50 includes an additional membrane array 52. The membrane array 52 generates a permeate stream 54 and a brine stream 56 from the brine stream 16 exiting the membrane array 12. The permeate stream 54 may be joined with the permeate stream 14 to form a single permeate stream 58.

The membrane array 52 includes a membrane housing 60 and a membrane 62. The portion of the brine stream 16 that flows through the membrane 62 before exiting the membrane array 52 forms the permeate stream 54. The portion of the brine stream 16 that does not flow through the membrane 62 before exiting the membrane array 52 forms the brine stream 56. The brine stream 56 flows through the control valve 28 and to the drain 30.

Figure 3:
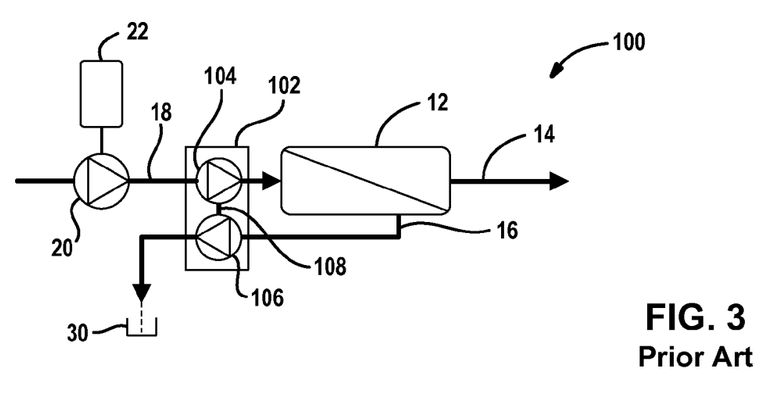
FIG. 3 is a schematic view of a third reverse osmosis system according to the prior art.

Referring now to FIG. 3, a reverse osmosis system 100 according to the prior art is similar to the reverse osmosis system 10 of FIG. 1 except that the reverse osmosis system 100 includes a hydraulic pressure booster 102. The booster 102 is used to recover hydraulic energy from the brine stream 16 and includes a pump portion 104 and a turbine portion 106. The pump portion 104 and the turbine portion 106 are coupled together with a common shaft 108. The brine stream 16, at a high pressure, passes through the turbine portion 106, which causes the shaft 108 to rotate and drive the pump portion 104. After passing through the turbine portion 106, the brine stream 16 is at a low pressure and flows to the drain 30.

The pump portion 104 increases the feed pressure in the feed stream 18. The booster 102 generates a portion of the feed pressure requirement for the membrane array 12 and, thus, the feed pump 20 and the motor 22 may be reduced in size since a reduced amount of pressure is required by them. In addition, the amount of energy consumed by the feed pump 20 and the motor 22 will be reduced.

Figure 4:
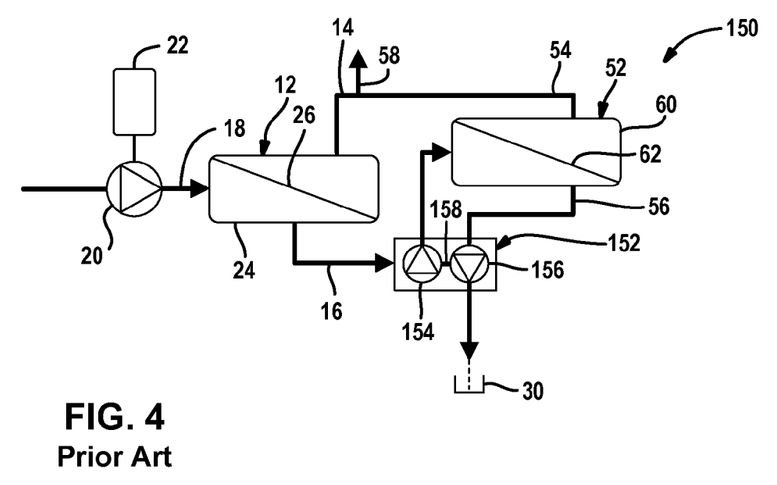
FIG. 4 is a schematic view of a fourth reverse osmosis system according to the prior art.

Referring now to FIG. 4, a reverse osmosis system 150 according to the prior art is similar to the reverse osmosis system 50 of FIG. 2 except that the reverse osmosis system 150 includes a hydraulic pressure booster 152. The booster 152 is used to recover energy from the brine stream 56 and includes a pump portion 154 and a turbine portion 156. The pump portion 154 and the turbine portion 156 are coupled together with a common shaft 158. The brine stream 56, at a high pressure, passes through the turbine portion 156, which causes the shaft 158 to rotate and drive the pump portion 154. After passing through the turbine portion 156, the brine stream 56 is at a low pressure and flows to the drain 30.

The pump portion 154 increases the pressure of the brine stream 16 before the brine stream 16 enters the membrane array 52. The amount of solids dissolved in the brine stream 16 may be greater than the amount of solids dissolved in the feed stream 18. Thus, it may be necessary to increase the pressure of the brine stream 16 to a higher pressure relative to the pressure of the feed stream 18. A motor-driven, interstage pump (not shown) may be included between the membrane arrays 12, 52 to increase the pressure of the brine stream 16 to this higher pressure. However, since the booster 152 is driven by the hydraulic energy in the brine stream 16, the booster 152 may consume less energy relative to the interstage pump. In addition, using the booster 152 may allow the pressure of the feed stream 18 to be reduced. Thus, the feed pump 20 and the motor 22 may be reduced in size since a reduced amount of pressure is required by them. In addition, the amount of energy consumed by the feed pump 20 and the motor 22 may be reduced.

SUMMARY

This section provides a general summary of the disclosure, and is not a comprehensive disclosure of its full scope or all of its features.

A first reverse osmosis system according to the present disclosure includes a pump, a first membrane array, a second membrane array, a hydraulic pressure booster, and a motor-generator. The pump is operable to pressurize a feed stream. The first membrane array is configured to generate a first permeate stream and a first brine stream from a feed stream. The second membrane array is configured to generate a second permeate stream and a second brine stream from the first brine stream. The booster is configured to use energy from the second brine stream to increase pressure of at least one of the feed stream and the first brine stream. The motor-generator is coupled to the hydraulic pressure booster and is operable to use energy from a power supply to drive the hydraulic pressure booster. The motor-generator is also operable to use energy from the second brine stream to provide power to the power supply.

A second reverse osmosis system according to the present disclosure includes a pump, a first membrane array, a second membrane array, a first hydraulic pressure booster, and a second hydraulic pressure booster. The pump is operable to pressurize a feed stream. The first membrane array is configured to receive the feed stream and to generate a first permeate stream and a first brine stream from the feed stream. The second membrane array configured to receive the first brine stream and to generate a second permeate stream and a second brine stream from the first brine stream. The first hydraulic pressure booster is configured to receive a first portion of the second brine stream and to use energy from the second brine stream to increase the pressure of the first brine stream. The second hydraulic pressure booster is configured to receive a second portion of the second brine stream and to use energy from the second brine stream to increase the pressure of the feed stream.

A method for operating a reverse osmosis system according to the present disclosure includes directing a feed stream to a first membrane array to separate the feed stream into a first permeate stream and a first brine stream, directing the first brine stream to a second membrane array to separate the first brine stream into a second permeate stream and a second brine stream, and controlling a torque output of a motor-generator coupled to a first hydraulic pressure booster to adjust an amount by which the first hydraulic booster increases a pressure of at least one of the feed stream and the first brine stream.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 5:
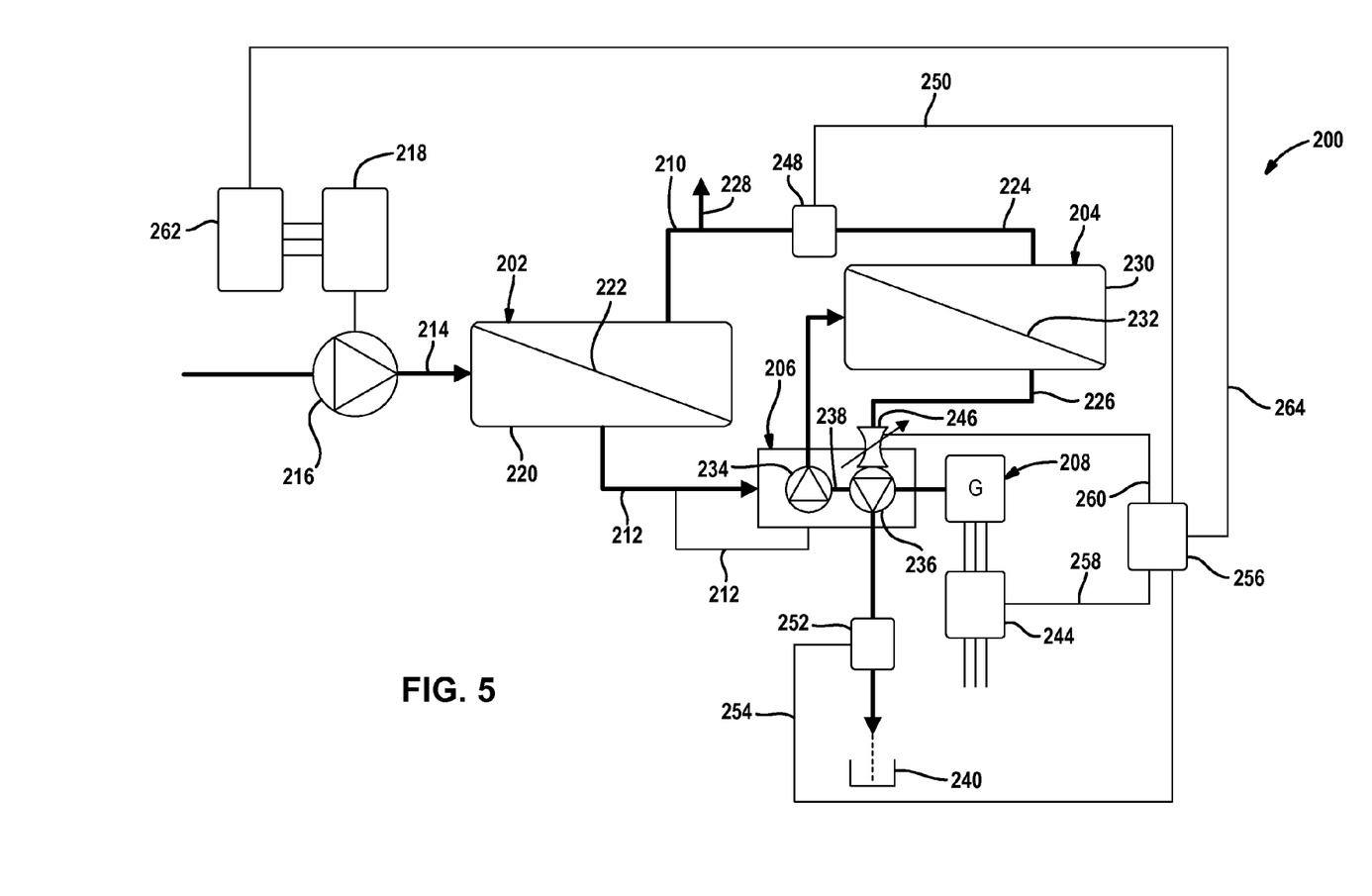
FIG. 5 is a schematic view of a first reverse osmosis system according to the present disclosure.

Referring now to FIG. 5, a reverse osmosis system 200 according to the present disclosure includes a membrane array 202, a membrane array 204, a hydraulic pressure booster 206, and a motor-generator 208. The membrane array 202 generates a permeate stream 210 and a brine stream 212 from a feed stream 214. The feed stream 214 may include brackish or sea water. A feed pump 216 coupled to a motor 218 pressurizes the feed stream 214 to a required pressure, and the feed stream 214 enters the membrane array 202 at the required pressure.

The membrane array 202 includes a membrane housing 220 and a membrane 222. The portion of the feed stream 214 that flows through the membrane 222 before exiting the membrane array 202 forms the permeate stream 210. The portion of the feed stream 214 that does not flow through the membrane 222 before exiting the membrane array 202 forms the brine stream 212. The permeate stream 210 is purified fluid flow at a low pressure. The brine stream 212 contains dissolved materials blocked by the membrane 222. The pressure of the brine stream 212 is only slightly lower than the feed stream 214.

The membrane array 204 generates a permeate stream 224 and a brine stream 226 from the brine stream 212. The permeate stream 224 may be joined with the permeate stream 210 to form a single permeate stream 228. The membrane array 204 includes a membrane housing 230 and a membrane 232. The portion of the brine stream 212 that flows through the membrane 232 before exiting the membrane array 204 forms the permeate stream 224. The portion of the brine stream 212 that does not flow through the membrane 232 before exiting the membrane array 204 forms the brine stream 226. The permeate stream 224 is purified fluid flow at a low pressure. The brine stream 226 contains dissolved materials blocked by the membrane 232. The pressure of the brine stream 226 is only slightly lower than the brine stream 212.

The booster 206 is used to recover energy from the brine stream 226 and includes a pump portion 234 and a turbine portion 236. The pump portion 234 and the turbine portion 236 are coupled together with a common shaft 238. The brine stream 226, at a high pressure, passes through the turbine portion 236, which causes the shaft 238 to rotate and drive the pump portion 234. After passing through the turbine portion 236, the brine stream 226 is at a low pressure and flows to a drain 240.

The pump portion 234 increases the pressure of the brine stream 212 as the brine stream 212 flows through the pump portion 234. The amount of solids dissolved in the brine stream 212 may be greater than the amount of solids dissolved in the feed stream 214. Thus, it may be necessary to increase the pressure of the brine stream 212 to a higher pressure relative to the pressure of the feed stream 214. A motor-driven, interstage pump (not shown) may be included between the membrane arrays 202, 204 to increase the pressure of the brine stream 212 to this higher pressure. However, since the booster 206 is driven by the hydraulic energy in the brine stream 226, the booster 206 may consume less energy relative to the interstage pump. In addition, using the booster 206 may allow the pressure of the feed stream 214 to be reduced. Thus, the feed pump 216 and the motor 218 may be reduced in size since a reduced amount of pressure is required by them. In addition, the amount of energy consumed by the feed pump 216 and the motor 218 may be reduced.

The shaft 238 of the booster 206 may extend to the motor-generator 208. The motor-generator 208 may act as a motor by using power from a reverse osmosis facility power supply (not shown) to drive the turbine portion 236. The motor-generator 208 may act as a generator by converting the hydraulic energy in the brine stream 226 that drives the turbine portion 236 of the booster 206 into electrical energy that may be returned to the power supply. The hydraulic energy in the brine stream 226 may be significantly greater than the amount of energy required to drive the pump portion 234 to increase the brine stream 212 to a desired pressure. The motor-generator 208 captures this excess energy instead of allowing the excess energy to be wasted.

The motor-generator 208 may be electrically connected to a variable frequency drive (VFD) 244. The VFD 244 may be used to adjust the amount of load placed on the motor-generator 208 to ensure that the booster 206 produces a desired amount of boost (i.e., to ensure that the booster 206 increases the pressure of the brine stream 212 by a desired amount). The amount of boost produced by the booster 206 is inversely proportional to the amount of load placed on the motor-generator 208. The amount of electrical energy generated by the motor-generator 208 is directly proportional to the amount of load placed on the motor-generator 208.

The booster 206 may include a variable geometry nozzle 246 that is adjustable to control the amount of flow through the turbine portion 236. The amount of flow through the turbine portion 236 may be controlled to adjust the amount of boost produced by the booster 206. The amount of flow through the turbine portion 236 may also be controlled to maximize the amount of energy that the booster 206 and the motor-generator 208 capture from the brine stream 226.

A flow meter 248 measures the flow of the permeate stream 224 and generates a sensor signal 250 indicating the flow of the permeate stream 224. A flow meter 252 measures the flow of the brine stream 226 and generates a sensor signal 254 indicating the flow of the brine stream 226. A controller 256 receives the sensor signals 250, 254 and outputs control signals 258, 260 to the VFD 244 and the variable geometry nozzle 246, respectively.

The controller 256 may control the variable geometry nozzle 246 to ensure that the membrane array 204 produces a desired amount of brine. If the flow of the brine stream 226 is less than a desired amount, the controller 256 may increase the area of the variable geometry nozzle 246. Increasing the area of the variable geometry nozzle 246 increases the flow of the brine stream 226. If the flow of the brine stream 226 is greater than a desired amount, the controller 256 may decrease the area of the variable geometry nozzle 246. Decreasing the area of the variable geometry nozzle 246 decreases the flow of the brine stream 226.

The controller 256 may control the variable geometry nozzle 246 to adjust the flow of the brine stream 226 to a desired amount for optimal operation of the membrane 232. In some conditions such as when the feed stream 214 includes sea water, the amount of hydraulic energy in the brine stream 226 may be greater than necessary for the booster 206 to generate a desired amount of boost. In these conditions, the motor-generator 208 produces electrical power. In other conditions such as when the feed stream 214 includes brackish water, the hydraulic energy in the brine stream 226 is insufficient to generate the desired boost amount. In these conditions, the motor-generator 208 acts like a motor and increases the speed of the shaft 238 to a level that is sufficient to achieve the desired boost amount.

In addition, the controller 256 may control the VFD 244 based on the flow of the permeate stream 224. For example, the controller 256 may increase the amount of load placed on the motor-generator 208 to decrease the amount of boost produced by the booster 206 and thereby decrease the flow of the permeate stream 224. Conversely, the controller 256 may decrease the amount of load placed on the motor-generator 208 to increase the amount of boost produced by the booster 206 and thereby increase the flow of the permeate stream 224.

The controller 256 may also control the VFD 244 to adjust the amount of power supplied to the motor-generator 208, and thereby adjust the output of the motor-generator 208 and the amount of boost produced by the booster 206. The controller 256 may adjust the amount of power supplied to the motor-generator 208 based on the flow of the permeate stream 224. For example, the controller 256 may increase the amount of power supplied to the motor-generator 208 to increase the amount of boost produced by the booster 206 and thereby increase the flow of the permeate stream 224. Increasing the amount of power supplied to the motor-generator 208 increases the speed of the motor-generator 208, which increases the pressure of the brine stream 212 and results in greater permeate flow. Conversely, the controller 256 may decrease the amount of power supplied to the motor-generator 208 to decrease the amount of boost produced by the booster 206 and thereby decrease the flow of the permeate stream 224. Decreasing the amount of power supplied to the motor-generator 208 decreases the speed of the motor-generator 208, which decreases the pressure of the brine stream 212 and results in less reduced flow.

The primary objective of the controller 256 may be to adjust the (negative or positive) torque output of the motor-generator 208 to adjust the amount of boost produced by the booster 206 to achieve a desired flow of the permeate stream 224. In addition, the controller 256 may adjust the variable geometry nozzle 246 to achieve a desired flow of the brine stream 226. Since the adjustment of each of these two control strategies will have an effect on the other control strategy, the adjustments may be gradually made in successive control loops with sufficient time between the control loops for the new equilibrium condition to be reached. After a number of adjustments are made for both control strategies, then the desired flow of the permeate stream 224 and the brine stream 226 will be achieved.

The controller 256 may adjust the speed of the shaft 238 of the motor-generator 208 to ensure that the membrane array 204 produces a desired amount of permeate. If the flow of the permeate stream 224 is greater than a desired amount, the controller 256 may decrease the speed of the shaft 238 to decrease the amount of boost produced by the booster 206 and thereby decrease permeate production. If the flow of the permeate stream 224 is less than the desired amount, the controller 256 may increase the speed of the shaft 238 to increase the amount of boost produced by the booster 206 and thereby increase permeate production.

Further, a VFD 262 may be electrically connected to the motor 218 to allow an adjustment of the pressure of the feed stream 214 that causes the membrane array 220 to adjust the flow of the permeate stream 210 to a desired flow. The controller 256 outputs a control signal 264 to the VFD 262. If the flow of the permeate stream 210 is less than the desired flow, the controller 256 may increase the speed of the motor 218 to increase the capacity of the feed pump 216 and thereby increase the pressure of the feed stream 214 to increase permeate production. If the flow of the permeate stream 210 is greater than the desired flow, the controller 322 may decrease the speed of the motor 218 to decrease the capacity of the feed pump 216 and thereby decrease the pressure of the feed stream 214 to decrease permeate production.

Figure 6:
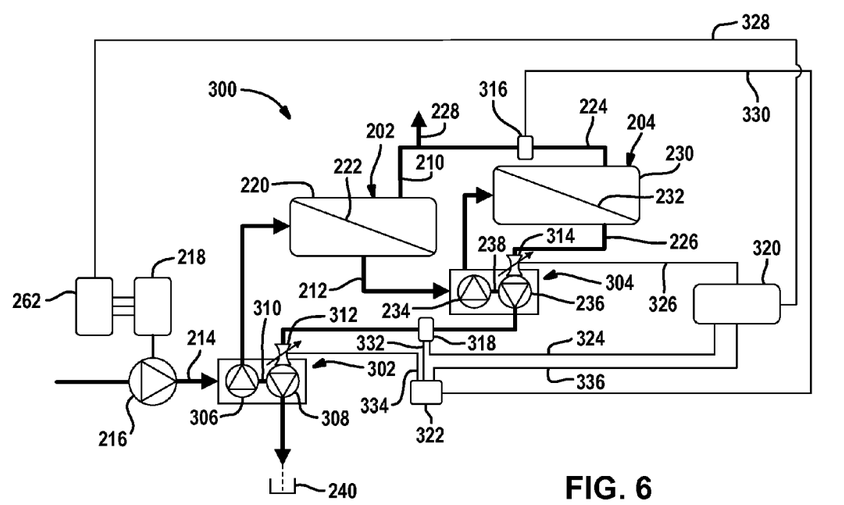
FIG. 6 is a schematic view of a second reverse osmosis system according to the present disclosure.

Referring now to FIG. 6, a reverse osmosis system 300 is similar to the reverse osmosis system 200 of FIG. 5. However, the reverse osmosis system 300 includes a pair of hydraulic pressure boosters 302, 304 instead of the booster 206 (i.e., a single booster) in order to fully utilize energy from the brine stream 226. The booster 304 is similar to the booster 206 except that the booster 304 the shaft 238 of the booster 304 does not extend to a motor-generator. In addition, the reverse osmosis system 300 is shown without the motor-generator 208, the VFD 244, the flow meters 248, 252, and the controller 256. However, in various implementations, the reverse osmosis system 300 may include one or more of the aforementioned elements not shown.

The booster 302 is used to recover energy from the brine stream 226 and includes a pump portion 306 and a turbine portion 308. The pump portion 306 and the turbine portion 308 are coupled together with a common shaft 310. The brine stream 226 passes through the turbine portion 308 after passing through the turbine portion 236 of the booster 304. Thus, although the brine stream 226 entering the turbine portion 308 may be at a high pressure, the pressure of the brine stream 226 at the inlet of the turbine portion 308 may be less than the pressure of the brine stream 226 at the inlet of the turbine portion 236. This decrease in the pressure of the brine stream 226 as the brine stream 226 passes through the turbine portion 236 is due to the energy required to drive the booster 304. After passing through the turbine portion 236, the brine stream 226 is at a low pressure and flows to the drain 240.

The pump portion 306 of the booster 302 increases the pressure of the feed stream 214 as the feed stream 214 flows through the pump portion 306. Thus, the booster 302 provides a desired amount of boost between the feed pump 216 and the membrane array 202, while the booster 304 provides a desired amount of boost between the membrane arrays 202, 204. In this way, the boosters 302, 304 maximize the amount of energy recovered from the brine stream 226 and thereby increase the energy efficiency of the system.

The efficiency of each of the boosters 302, 304 may be partly determined by the relationship between the brine flow and the brine pressure differential across their respective turbine portions. In addition, the efficiency of each of the boosters 302, 304 may be partly determined by the ratio of the flow through their respective pump portions to the flow through their respective turbine portions. Since the entire brine stream 226 flows through each of the boosters 302, 304, the total pressure drop in the brine stream 226 is divided between the boosters 302, 304.

The booster 302 can include a variable area turbine nozzle 312 and the booster 304 can include a variable area turbine nozzle 314. In addition, a flow meter 316 may measure the flow of the permeate stream 224, and a flow meter 318 may measure the flow of the brine stream 226. A controller 320 may adjust the variable area turbine nozzle 314 on the booster 304 to achieve a desired flow of the brine stream 226. A controller 322 may adjust the variable area turbine nozzle 312 on the booster 302 to adjust the pressure difference across the turbine portion 236 and thereby adjust the amount of boost produced by the pump portion 234 to achieve a desired flow of the permeate stream 224.

The controller 320 receives a sensor signal 324 from the flow meter 318, and the controller 320 outputs a control signal 326 to the variable area turbine nozzle 314. The controller 320 may also output a control signal 328 to the VFD 262, as shown, or the controller 322 may output a control signal to the VFD 262. The controller 322 receives sensor signals 330, 332 from the flow meters 316, 318, respectively, and outputs a control signal 334 to the variable area turbine nozzle 316. The controllers 320, 322 may communicate with each other via a control signal 336 to coordinate control of the variable area turbine nozzles 312, 314. In various implementations, the controllers 320, 322 may be implemented in a single controller.

The booster 304 may obtain all of the energy needed from the brine stream 226 to increase the pressure of the brine stream 212 and thereby achieve the desired flow of the permeate stream 224. The flow of the brine stream 226 may be adjusted to achieve a desired flow by adjusting the variable area turbine nozzle on the booster 304. The remaining pressure in the brine stream 226 may be used by the booster 302 to generate a pressure boost in the feed stream 214. The VFD 262 may be connected to the motor 218 to allow an adjustment of the pressure of the feed stream 214 that, when added to the pressure boost from the booster 302, allows the membrane array 220 to adjust the flow of the permeate stream 210 to a desired flow.

Figure 7:
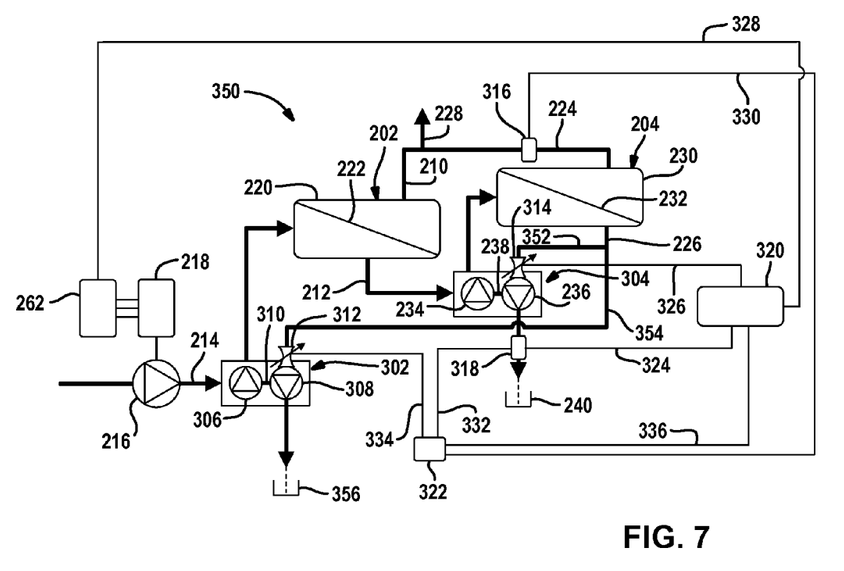
FIG. 7 is a schematic view of a third reverse osmosis system according to the present disclosure.

Referring now to FIG. 7, a reverse osmosis system 350 is similar to the reverse osmosis system 300 of FIG. 6 except that, in the reverse osmosis system 350, the brine stream 226 is routed directly to both of the boosters 302, 304. Routing the brine stream 226 directly to both of the boosters 302, 304 may increase the efficiency of each of the boosters 302, 304. To route the brine stream 226 directly to both of the boosters 302, 304, the brine stream 226 is separated into a pair of brine streams 352, 354. As a result, each of the boosters 302, 304 receives a smaller portion of brine flow at a high pressure.

The brine stream 352 passes through the turbine portion 236 of the booster 304, which drives the pump section 234 and increases the pressure of the brine stream 212. After passing through the turbine portion 236, the brine stream 352 flows to the drain 240. The brine stream 354 passes through the turbine section 308 of the booster 302, which drives the pump section 306 and increases the pressure of the feed stream 214. After passing through the turbine portion 308, the brine stream 354 flows to a drain 356.

The control scheme of the reverse osmosis system 350 of FIG. 7 may be similar to the control scheme of the reverse osmosis system 300 of FIG. 6 in that the booster 304 may use as much pressure from the brine stream 226 as necessary to adjust the flow of the permeate stream 224 to a desired flow. The remainder of the pressure in the brine stream 226 is available to the booster 302 to generate a pressure boost in the feed stream 214. The VFD 262 drives the motor 218 to adjust the discharge pressure from the feed pump 216 and thereby adjust the flow of the permeate stream 210 to a desired flow.

Figure 8:
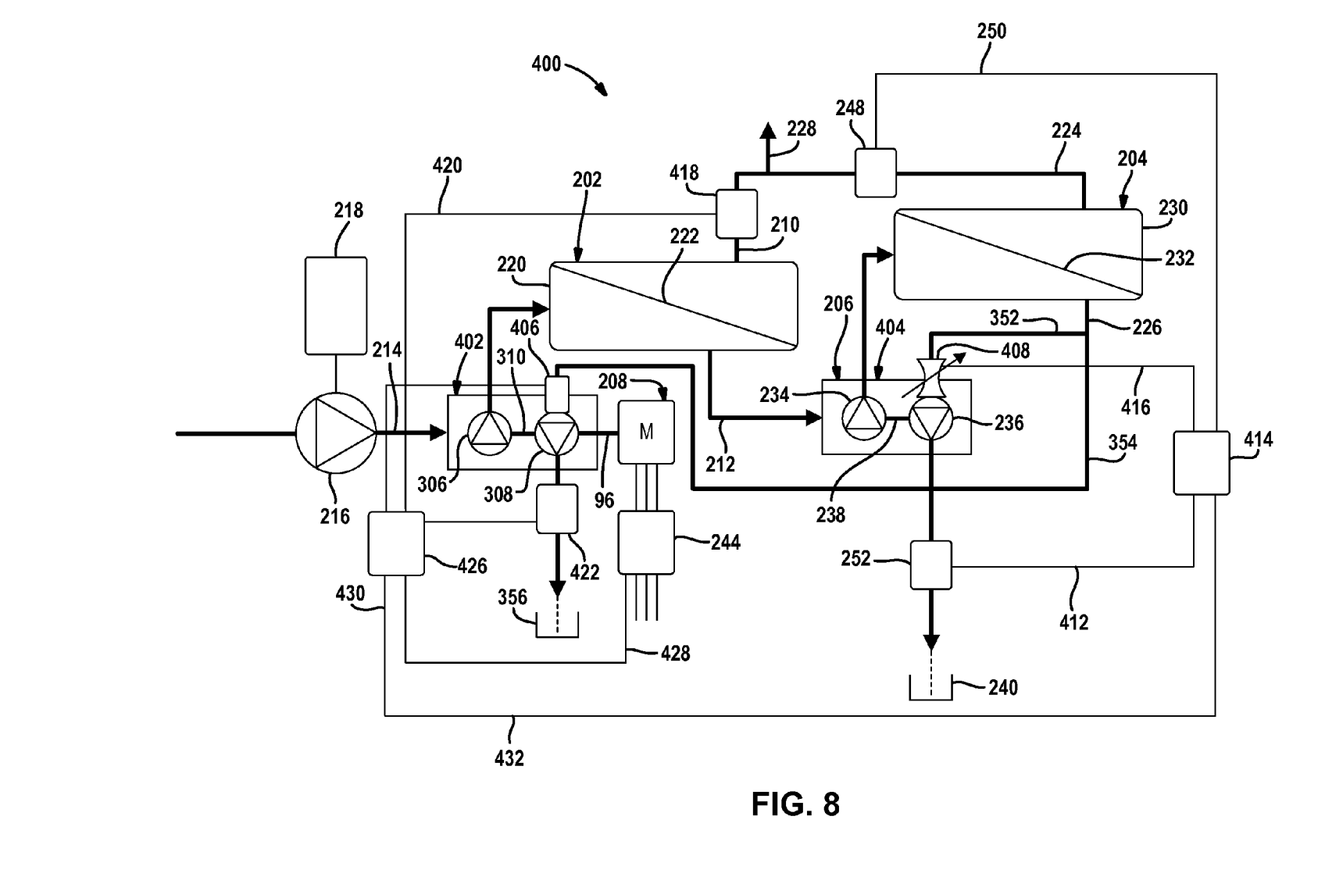
FIG. 8 is a schematic view of a fourth reverse osmosis system according to the present disclosure.

Referring now to FIG. 8, a reverse osmosis system 400 is similar to the reverse osmosis system 350 of FIG. 8 except that the system 400 includes a pair of hydraulic pressure boosters 402, 404 instead of the boosters 302, 304. The boosters 402, 404 are similar to the boosters 302, 304 except that the boosters 402, 404 include variable geometry nozzles 406, 408, respectively. In addition, the shaft 310 of the booster 402 may extend to the motor-generator 208.

The motor-generator 208 may act as a motor by using power from a reverse osmosis facility power supply (not shown) to drive the turbine portion 308. The motor-generator 208 may act as a generator by converting the hydraulic energy in the brine stream 354 that drives the turbine portion 308 into electrical energy that may be returned to the power supply. The hydraulic energy in the brine stream 354 may be significantly greater than the amount of energy required to drive the pump portion 306 to increase the feed stream 214 to a desired pressure. The motor-generator 208 captures this excess energy instead of allowing the excess energy to be wasted.

As discussed above, the motor-generator 208 may be electrically connected to the VFD 244. The VFD 244 may be used to adjust the amount of load placed on the motor-generator 208 to ensure that the booster 402 produces a desired amount of boost (i.e., to ensure that the booster 402 increases the pressure of the feed stream 214 by a desired amount). The amount of boost produced by the booster 402 is inversely proportional to the amount of load placed on the motor-generator 208. The amount of electrical energy generated by the motor-generator 208 is directly proportional to the amount of load placed on the motor-generator 208.

The variable geometry nozzles 406, 408 are adjustable to control the amount of flow through the turbine portions 308, 236, respectively. The amount of flow through the turbine portions 308, 236 may be controlled to adjust the amount of boost produced by the boosters 402, 404. The amount of flow through the turbine portions 308, 236 may also be controlled to maximize the amount of energy that the boosters 402, 404 and the motor-generator 208 capture from the brine stream 226.

As in the system 200 of FIG. 5, the flow meter 248 measures the flow of the permeate stream 224 and generates the sensor signal 250 indicating the flow of the permeate stream 224. The flow meter 252 measures the flow of the brine stream 352 (i.e., the portion of the brine stream 226 that passes through the booster 404) and generates a sensor signal 412 indicating the flow of the brine stream 352. A controller 414 receives the sensor signals 250, 254 and outputs a control signal 416 to the variable geometry nozzle 408.

The controller 414 may control the variable geometry nozzle 408 to ensure that the membrane array 204 produces a desired amount of permeate. If the flow of the permeate stream 224 is less than a desired amount, the controller 414 may increase the area of the variable geometry nozzle 408 to increase the amount of boost produced by the booster 404. Increasing the amount of boost produced by the booster 404 increases the flow and pressure of the brine stream 212, which increases the amount of permeate produced by the membrane array 204. If the flow of the permeate stream 224 is greater than a desired amount, the controller 414 may decrease the area of the variable geometry nozzle 408 to decrease the amount of boost produced by the booster 404. Decreasing the amount of boost produced by the booster 404 decreases the flow and pressure of the brine stream 212, which decreases the amount of permeate produced by the membrane array 204. The controller 414 may also control the variable geometry nozzle 408 to adjust the flow of the brine stream 352 to a desired amount.

A flow meter 418 measures the flow of the permeate stream 210 and generates a sensor signal 420 indicating the flow of the permeate stream 210. A flow meter 422 measures the flow of the brine stream 354 (i.e., the portion of the brine stream 226 that passes through the booster 402) and generates a sensor signal 424 indicating the flow of the brine stream 354. A controller 426 receives the sensor signals 420, 424 and outputs control signals 428, 430 to the VFD 244 and the variable geometry nozzle 406, respectively.

The controller 426 may control the variable geometry nozzle 406 to ensure that the membrane array 202 produces a desired amount of permeate. If the flow of the permeate stream 210 is less than a desired amount, the controller 426 may increase the area of the variable geometry nozzle 406 to increase the amount of boost produced by the booster 402. Increasing the amount of boost produced by the booster 402 increases the flow and pressure of the feed stream 214, which increases the amount of permeate produced by the membrane array 202. If the flow of the permeate stream 210 is greater than a desired amount, the controller 426 may decrease the area of the variable geometry nozzle 406 to decrease the amount of boost produced by the booster 402. Decreasing the amount of boost produced by the booster 402 decreases the flow and pressure of the feed stream 214, which decreases the amount of permeate produced by the membrane array 202.

The controller 426 may also control the variable geometry nozzle 406 to adjust the flow of the brine stream 354 to a desired amount. In addition, the controller 426 may control the VFD 244 based on the flow of the permeate stream 210 and/or the flow of the brine stream 354. For example, the controller 426 may increase the amount of load placed on the motor-generator 208 to decrease the amount of boost produced by the booster 402 and thereby decrease the flow of the permeate stream 210. Conversely, the controller 426 may decrease the amount of load placed on the motor-generator 208 to increase the amount of boost produced by the booster 402 and thereby increase the flow of the permeate stream 210.

The controller 426 may also control the VFD 244 to adjust the amount of power supplied to the motor-generator 208, and thereby adjust the output of the motor-generator 208 and the amount of boost produced by the booster 402. The controller 426 may adjust the amount of power supplied to the motor-generator 208 based on the flow of the permeate stream 210 and/or the brine stream 354. For example, the controller 426 may increase the amount of power supplied to the motor-generator 208 to increase the amount of boost produced by the booster 206 and thereby increase the flow of the permeate stream 210. Conversely, the controller 426 may decrease the amount of power supplied to the motor-generator 208 to decrease the amount of boost produced by the booster 402 and thereby decrease the flow of the permeate stream 210.

The controllers 414, 426 may communicate with each other via a control signal 432 to ensure that the flow of the brine stream 212 is sufficient to allow the booster 404 to satisfy the pressure requirement for the membrane array 204. The controller 426 may control the variable geometry nozzle 406 to prevent the booster 404 from absorbing too much energy from the brine stream 226 and thereby starving the booster 404. The controller 414 may provide the flows of the permeate and brine streams 224, 352 to the controller 426. The controller 426 may control the variable geometry nozzle 406 based on the flows of permeate and brine streams 224, 352. If the flow of the brine stream 352 is less than desired, the controller 426 may decrease the area of the nozzle 406 to increase the flow of the brine stream 352. This increases the amount of boost produced by the booster 404 and thereby increases the flow of the brine stream 212.

The controller 426 may use the output of the motor-generator 208 as the primary means to control the pressure of the feed stream 214 provided to the membrane array 204 for desired permeate production. For example, the controller 426 may control the variable geometry nozzle 406 to yield a desired flow of the brine stream 352. The controller 426 may then control the output of the motor-generator 208 to provide an additional boost amount beyond that which may be achieved when the variable geometry nozzle 406 is controlled to yield the desired flow of the brine stream 352.

In various implementations, the controller 414 may control the variable geometry nozzle 408 based on the flows of the permeate and brine streams 210, 354. In addition, the controllers 414, 426 may be combined into a single controller. The instrumentation and controllers of FIG. 8 may be employed in other embodiments disclosed herein to precisely control pressures and flows in a reverse osmosis system and thereby achieve optimal system performance.

Coupling the motor-generator 208 to the booster 402 may eliminate the need for the VFD 262 to control the motor 218. Thus, the controller 426 may adjust the booster 426 to adjust the pressure of the feed stream 214 as needed for the membrane array 202 to produce a desired amount of permeate. Although the instrumentation and controllers of FIG. 8 are shown in conjunction with the parallel brine stream arrangement of FIG. 7, the instrumentation and controllers may be used with the series brine stream arrangement of FIG. 6.

A reverse osmosis system with two membrane stages such as any of the systems shown in FIGS. 6 through 8 may be more energy-efficient than a single stage system of similar capacity. Since pressure is added in two steps, a two stage system requires less pressurization to produce the desired amount of permeate relative to a single stage system. For example, a single stage system may pressurize an entire feed stream to 1,000 psig. In contrast, a two stage system may pressurize the entire feed stream to 800 psig, and then only increase the pressure of the brine stream from the first stage by an additional 200 psig to reach 1,000 psig. Thus, the total pumping energy is less in the two stage system. A three stage system would have even a larger advantage in energy efficiency, but the advantage may not be sufficient to justify the added cost and complexity of a three stage system. In addition to energy efficiency benefits, a two stage system according to the present disclosure allows control of brine flow at the first and second stages. Further, a two stage system according to the present disclosure allows control of permeate production at the first and second stages.

Figure 9:
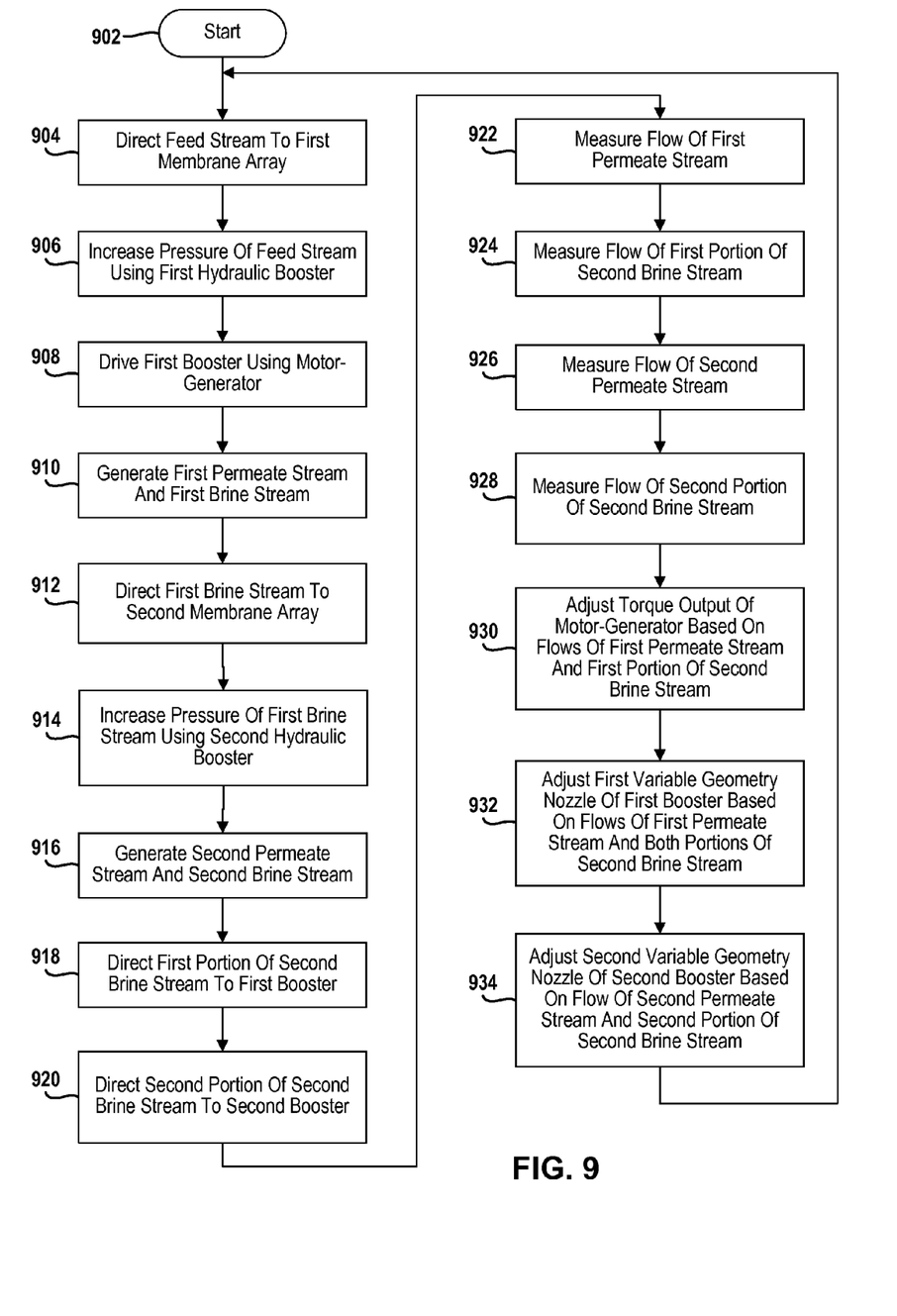
FIG. 9 is a flowchart illustrating a method for operating a reverse osmosis system according to the present disclosure.

Referring now to FIG. 9, a method for operating a reverse osmosis system begins at 902. At 904, the method directs a feed stream to a first membrane array using, for example, a feed pump. At 906, the method increases the pressure of the feed stream using a first hydraulic booster. At 908, the method drives the first hydraulic booster using a motor-generator coupled to the first hydraulic booster. The method may also capture energy absorbed by the first hydraulic booster using the motor-generator. At 910, the method generates a first permeate stream and a first brine stream from the feed stream using the first membrane array.

At 912, the method directs the first brine stream to a second membrane array. At 914, the method increases the pressure of the first brine stream using a second hydraulic booster. At 916, the method generates a second permeate stream and a second brine stream from the first brine stream using the second membrane array. At 918, the method directs a first portion of the second brine stream to the first hydraulic booster. At 920, the method directs a second portion of the second brine stream to the second hydraulic booster.

At 922, the method measures flow of the first permeate stream using, for example, a first flow meter. At 924, the method measures flow of the first portion of the second brine stream using, for example, a second flow meter. At 926, the method measures flow of the second permeate stream using, for example, a third flow meter. At 928, the method measures flow of the second portion of the second brine stream using, for example, a fourth flow meter.

At 930, the method adjusts the torque output of the motor-generator based on the flows of the first permeate stream and the first portion of the second brine stream. At 932, the method adjusts a first variable geometry nozzle of the first hydraulic booster based on the flows of the first permeate stream and the first and second portions of the second brine stream. At 934, the method adjusts a second variable geometry nozzle of the second hydraulic booster based on the flows of the second permeate stream and the second portion of the second brine stream.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A reverse osmosis system comprising:
a pump operable to pressurize a feed stream;
a first membrane array configured to receive the feed stream and to generate a first permeate stream and a first brine stream from the feed stream;
a second membrane array configured to receive the first brine stream and to generate a second permeate stream and a second brine stream from the first brine stream;
a first hydraulic pressure booster comprising a shaft, a pump that is coupled to and rotates with the shaft, a first variable area nozzle, and turbine that is coupled to and rotates with the shaft, the first hydraulic pressure booster configured to receive at least a first portion of the second brine stream and to use energy from the first portion of the second brine stream to increase a pressure of at least one of the feed stream and the first brine stream;
an electric motor-generator coupled to the shaft of the first hydraulic pressure booster, (a) operable to act as a motor to use electric power from a power supply to drive the shaft of the first hydraulic pressure booster, and (b) operable to (i) convert hydraulic energy from the second brine stream into electrical energy and (ii) return the electrical energy to the power supply;
a first flow meter that measures a flow of the first permeate stream;
a second flow meter that measures a flow of the first portion of the second brine stream, said flow of the first portion of the second brine stream less than a flow of the second brine stream;
a first controller controls the first variable area nozzle based on the flow of the first permeate stream and based on the flow of the first portion of the second brine stream; and
the first controller controls the first variable area nozzle to adjust the flow of the first portion of the second brine stream through the first hydraulic pressure booster and thereby adjust an amount by which the first hydraulic pressure booster increases the pressure of the feed stream.

2. The reverse osmosis system of claim 1 wherein the first membrane array is configured to receive the feed stream directly from the pump.

3. The reverse osmosis system of claim 1 wherein the first hydraulic pressure booster is configured to increase the pressure of the feed stream, and the first membrane array is configured to receive the feed stream after the feed stream flows through the first hydraulic pressure booster.

4. The reverse osmosis system of claim 3 further comprising a variable frequency drive operable to adjust at least one of an amount of power supplied to the electric motor-generator and an amount of load placed on the shaft by the electric motor-generator to increase the pressure of the feed stream by a desired amount.

5. The reverse osmosis system of claim 3 wherein the first controller further controls a variable frequency drive to adjust at least one of an amount of power supplied to the electric motor-generator and an amount of load placed on the electric motor-generator.

6. The reverse osmosis system of claim 1 further comprising a second hydraulic pressure booster configured to receive a second portion of the second brine stream and to use energy from the second portion of the second brine stream to increase the pressure of the first brine stream.

7. The reverse osmosis system of claim 6 wherein the second hydraulic pressure booster includes a second variable area nozzle.

8. The reverse osmosis system of claim 7 further comprising a second controller that controls the second variable area nozzle to adjust the flow of the second portion of the second brine stream through the second hydraulic pressure booster and thereby adjust an amount by which the second hydraulic pressure booster increases the pressure of the first brine stream.

9. The reverse osmosis system of claim 8 further comprising a first flow meter that measures the flow of the second permeate stream, wherein the second controller controls the second variable area nozzle based on the flow of the second permeate stream.

10. The reverse osmosis system of claim 9 further comprising a second flow meter that measures the flow of the second portion of the second brine stream, wherein the second controller controls the second variable area nozzle based on the flow of the second portion of the second brine stream.

11. The reverse osmosis system of claim 10 wherein the first controller controls the first variable area nozzle based on the flow of the second portion of the second brine stream.

12. A reverse osmosis system comprising:
a pump operable to pressurize a feed stream;
a first membrane array configured to receive the feed stream and to generate a first permeate stream and a first brine stream from the feed stream;
a second membrane array configured to receive the first brine stream and to generate a second permeate stream and a second brine stream from the first brine stream;
a first hydraulic pressure booster comprising a first shaft, a first pump that is coupled to and rotates with the first shaft, and a first turbine that is coupled to and rotates with the first shaft, the first hydraulic pressure booster configured to receive a first portion of the second brine stream and to use energy from the first portion of the second brine stream to increase the pressure of the first brine stream, wherein the first hydraulic pressure booster includes a first variable area nozzle;
a second hydraulic pressure booster comprising a second shaft, a second pump that is coupled to and rotates with the second shaft, and a second turbine that is coupled to and rotates with the second shaft, the second hydraulic pressure booster configured to receive a second portion of the second brine stream and to use energy from the second portion of the second brine stream to increase the pressure of the feed stream, wherein the second hydraulic pressure booster includes a second variable area nozzle; and
a motor-generator coupled to the second shaft of the second hydraulic pressure booster, the motor-generator (a) operable to act as a motor to use electric power from a power supply to drive the second shaft of the second hydraulic pressure booster, and (b) operable to (i) convert hydraulic energy from the second portion of the second brine stream into electrical energy and (ii) return the electrical energy to the power supply;
a controller operatively coupled to the first variable area nozzle, the second variable area nozzle and the motor-generator, said controller controlling the first area variable nozzle based on a flow of the first permeate stream, a flow of the first portion of the second brine stream and a flow of the second portion of the second brine stream, said controller controlling the second variable area nozzle in response to a flow of the second permeate stream, the flow of the second portion of the second brine stream, said controller adjusting torque output of the motor-generator based on the flow of the first permeate stream and the flow of the first portion of the second brine stream.

13. The reverse osmosis system of claim 12 wherein the controller controls the first variable area nozzle to adjust flow of the first portion of the second brine stream through the first hydraulic pressure booster and thereby adjust a first amount by which the first hydraulic pressure booster increases the pressure of the feed stream.

14. The reverse osmosis system of claim 12 wherein the controller controls the second variable area nozzle to adjust flow of the second portion of the second brine stream through the second hydraulic pressure booster and thereby adjust a second amount by which the second hydraulic pressure booster increases the pressure of the first brine stream.

15. A method for operating a reverse osmosis system comprising a first hydraulic pressure booster comprising a shaft, a pump that is coupled to and rotates with the shaft, a first variable area nozzle and a turbine that is coupled to and rotates with the shaft, the method comprising:
directing a pressurized feed stream to a first membrane array to separate the pressurized feed stream into a first permeate stream and a first brine stream;
directing the first brine stream to a second membrane array to separate the first brine stream into a second permeate stream and a second brine stream;
receiving, at the first hydraulic pressure booster, at least a first portion of the second brine stream;
using energy from the first portion of the second brine stream to increase a pressure of at least one of the feed stream and the first brine stream;
operating an electric motor-generator coupled to the shaft, (a) to act as a motor to use electric power from a power supply to drive the shaft of the first hydraulic pressure booster, and (b) (i) to convert hydraulic energy from the second brine stream into electrical energy and (ii) to return the electrical energy to the power supply;
measuring a flow of the first permeate stream at a first flow meter;
measuring a flow of the first portion of the second brine stream at a second flow meter, said flow of the first portion less than a flow of the second brine stream;
controlling, by a first controller, the first variable area nozzle based on the flow of the first permeate stream and based on the flow of the first portion of the second brine stream; and
controlling, by the first controller, the first variable area nozzle to adjust the flow of the first portion of the second brine stream through the first hydraulic pressure booster and thereby adjust an amount by which the first hydraulic pressure booster increases the pressure of the feed stream.

16. The method of claim 15 further comprising directing at least a first portion of the second brine stream through the first hydraulic pressure booster to increase the pressure of the feed stream by a first desired amount.

17. The method of claim 16 further comprising controlling a torque output of the motor-generator based on the flow of the at least one of the first permeate stream and the first portion of the second brine stream.

18. The method of claim 15 further comprising directing a second portion of the second brine stream though a second hydraulic pressure booster to increase the pressure of the first brine stream by a second desired amount.

19. The method of claim 18 further comprising measuring flow of at least one of the second permeate stream and the second portion of the second brine stream and controlling a second variable area nozzle of the second hydraulic pressure booster based on the flow of the at least one of the second permeate stream and the second portion of the second brine stream.

20. The method of claim 19 further comprising controlling the first variable area nozzle of the first hydraulic pressure booster based on the flow of the at least one of the second permeate stream and the second portion of the second brine stream.

\* \* \* \* \*